US008121063B2

(12) United States Patent
Jiang

(10) Patent No.: US 8,121,063 B2
(45) Date of Patent: *Feb. 21, 2012

(54) METHOD AND APPARATUS FOR HANDLING TIMERS DURING RE-ESTABLISHING RECEIVING SIDES IN A WIRELESS COMMUNICATIONS SYSTEM

(75) Inventor: Sam Shiaw-Shiang Jiang, Taipei (TW)

(73) Assignee: Innovative Sonic Limited, Port Louis (MU)

( * ) Notice: Subject to any disclaimer, the term of this patent is extended or adjusted under 35 U.S.C. 154(b) by 720 days.

This patent is subject to a terminal disclaimer.

(21) Appl. No.: 11/524,488

(22) Filed: Sep. 21, 2006

(65) Prior Publication Data

US 2007/0064602 A1    Mar. 22, 2007

Related U.S. Application Data

(60) Provisional application No. 60/596,402, filed on Sep. 21, 2005.

(51) Int. Cl.
  *H04B 7/00* (2006.01)
(52) U.S. Cl. .......... 370/310; 455/500; 455/69; 370/350; 370/394; 370/469; 370/341; 370/278
(58) Field of Classification Search .................. 370/229, 370/310, 346, 350, 469, 394; 455/63, 67, 455/69, 424, 517, 500; 714/18, 749
See application file for complete search history.

(56) References Cited

U.S. PATENT DOCUMENTS

| 6,697,331 | B1 * | 2/2004 | Riihinen et al. ............. 370/236 |
| 6,763,491 | B2 * | 7/2004 | McDonnell ................... 714/750 |
| 6,842,445 | B2 | 1/2005 | Ahmavaara et al. |
| 6,922,393 | B2 | 7/2005 | Jiang et al. |
| 6,947,394 | B1 * | 9/2005 | Johansson et al. ............ 370/282 |
| 6,987,981 | B2 | 1/2006 | Kuo |
| 7,054,270 | B2 * | 5/2006 | Yi et al. ........................ 370/232 |
| 7,171,224 | B2 | 1/2007 | Sarkkinen et al. |
| 7,325,172 | B2 | 1/2008 | Jang |
| 7,411,979 | B2 | 8/2008 | Jiang |
| 2002/0009005 | A1 | 1/2002 | Kahlman et al. |
| 2003/0016698 | A1 | 1/2003 | Chang et al. |
| 2003/0206534 | A1 | 11/2003 | Wu |

(Continued)

FOREIGN PATENT DOCUMENTS

CN    1476182    2/2004

(Continued)

OTHER PUBLICATIONS

3GPP TS 25.322 V6.4.0 (Jun. 2005), "Radio Link Control (RLC) Protocol Specification (Release 6)".

(Continued)

*Primary Examiner* — Kamran Afshar
*Assistant Examiner* — Khalid Shaheed
(74) *Attorney, Agent, or Firm* — Klein, O'Neill & Singh, LLP

(57) ABSTRACT

A communications device utilized in a wireless communications system has an RLC entity with a transmitting side and a receiving side. Handling timers during re-establishment of the receiving side includes only re-establishing the receiving side in the RLC entity of the communications device, stopping a first timer corresponding to the receiving side, and prolonging and not stopping a second timer corresponding to the transmitting side.

10 Claims, 3 Drawing Sheets

U.S. PATENT DOCUMENTS

| | | |
|---|---|---|
| 2004/0032851 A1* | 2/2004 | Wu .................................. 370/346 |
| 2004/0037327 A1* | 2/2004 | Torsner et al. ................. 370/517 |
| 2004/0047331 A1 | 3/2004 | Jang |
| 2004/0076182 A1 | 4/2004 | Wu |
| 2004/0148546 A1* | 7/2004 | Meyer et al. ..................... 714/18 |
| 2004/0153896 A1* | 8/2004 | Jang .............................. 714/701 |
| 2004/0184437 A1 | 9/2004 | Lee |
| 2004/0203623 A1 | 10/2004 | Wu |
| 2004/0208160 A1* | 10/2004 | Petrovic et al. ............... 370/350 |
| 2004/0252719 A1 | 12/2004 | Jami |
| 2005/0287957 A1 | 12/2005 | Lee et al. |
| 2006/0056441 A1* | 3/2006 | Jiang ............................ 370/449 |
| 2006/0098574 A1 | 5/2006 | Yi |
| 2006/0154603 A1 | 7/2006 | Sachs et al. |
| 2006/0281413 A1* | 12/2006 | Burbidge et al. ........... 455/67.11 |

FOREIGN PATENT DOCUMENTS

| | | |
|---|---|---|
| EP | 1 389 886 A1 | 2/2004 |
| EP | 1 424 823 A1 | 6/2004 |
| JP | 2001285350 A * | 10/2001 |
| JP | 2003-111147 | 4/2003 |
| JP | 2003-224618 A | 8/2003 |
| JP | 2004179917 | 6/2004 |
| JP | 2004364277 | 12/2004 |
| JP | 2005073250 | 3/2005 |
| JP | 2006522560 | 9/2006 |
| KR | 2003-0005064 A | 1/2003 |
| KR | 10-2004-0015672 A | 2/2004 |
| KR | 10-2004-0034398 A | 4/2004 |
| KR | 10-2007-0037979 | 4/2007 |
| TW | 496058 | 7/2002 |
| TW | 577204 | 2/2004 |
| TW | 588513 | 5/2004 |
| TW | I223520 | 11/2004 |
| WO | 2004091130 A1 | 10/2004 |

OTHER PUBLICATIONS

R2-052168 "Single Sided RLC Re-Establishment", Motorola, 3GPP RAN2 #48 meeting, Aug. 2005.

Xu et al., Proceedings of the 2002 Winter Simulation Conference, "Simulation Analysis of RLC Timers in UMTS Systems", pp. 506-512, (2002).

3GPP TS 25.322 V5.11.0, Radio Link Control (RLC) protocol specification (Release 5), Jun. 2005, P52-P53.

* cited by examiner

METHOD AND APPARATUS FOR HANDLING TIMERS DURING RE-ESTABLISHING RECEIVING SIDES IN A WIRELESS COMMUNICATIONS SYSTEM

CROSS REFERENCE TO RELATED APPLICATIONS

This application claims the benefit of U.S. Provisional Application No. 60/596,402, filed on Sep. 21, 2005 and entitled "Improved Single-Sided Re-establishment Method and Apparatus in a wireless communications system," the contents of which are incorporated herein by reference.

BACKGROUND OF THE INVENTION

1. Field of the Invention

The present invention relates to methods and apparatuses for re-establishing a receiving side of a communications device in a wireless communications system, and more particularly, to a method and apparatus for handling timers during re-establishing only the receiving side of an RLC layer of a communications device.

2. Description of the Prior Art

The third generation (3G) mobile communications system has adopted a Wideband Code Division Multiple Access (WCDMA) wireless air interface access method for a cellular network. WCDMA can provide high frequency spectrum utilization, universal coverage, and high quality, high speed multimedia data transmission. The WCDMA method also meets all kinds of QoS requirements simultaneously, providing diverse flexible two-way transmission services and better communication quality to reduce transmission interruption rates.

Taking a signal communications protocol standard set forth by the 3rd Generation Partnership Project (3GPP) as an example, targeting the Access Stratum (AS), the 3G mobile communications system defines various protocol stacks, such as Radio Resource Control (RRC), Radio Link Control (RLC), Media Access Control (MAC), Packet Data Convergence Protocol (PDCP), and Broadcast/Multicast Control (BMC). In addition, the 3G mobile communications system also provides different levels of transmission quality, and can operate in different corresponding modes according to different transmission quality requirements, such as: Transparent Mode (TM), Unacknowledged Mode (UM), and Acknowledged Mode (AM). TM is appropriate for use in services with high requirements for real-time transmission, UM is appropriate for use in services with requirements for real-time transmission and packet sequencing, and AM is appropriate for use in services with low requirements for real-time transmission, but high requirements for data accuracy.

In AM, the RLC layer combines a transmitting side and a receiving side. The transmitting side and the receiving side each process transmission and reception through the RLC layer, and both sides can share system resources. In some circumstances, the RLC layer must be reestablished, e.g. when changing a PDU size. The prior art reestablishes the RLC layer by reestablishing the transmitting side or the receiving side.

Directed at operations corresponding to reestablishing the RLC layer, a communications protocol specification established by the 3GPP (3GPP TS 25.322 V6.4.0(2005-06), "Radio Link Control (RLC) protocol specification (Release 6)") and a Change Request (R2-052168"Single Sided RLC Re-establishment", Motorola, 3GPP RAN2 #48 meeting, August 2005) are already described in detail. The details of the communications protocol specification and the Change Request can be summarized as follows: When reestablishment of a transmitting side and/or a receiving side of an AM RLC entity is initiated by an upper layer, the RLC entity should execute the following two operations:

1. If the receiving side of the RLC entity is being reestablished, reset state variables (VR(R), VR(H), and VR(MR)) corresponding to a receiver; set configurable protocol parameters (Configured_Tx_Window_Size and Configured_Rx_Window_Size) corresponding to the receiver to accurate values; set a Hyper Frame Number of the receiving side (downlink of the receiver) to a value set by the upper layer; and discard all control PDUs of the receiving side and the transmitting side, and discard data PDUs of the receiving side. If only the receiving side is being reestablished, the prior arts described above have not yet disclosed a method of handling a timer.

2. If the transmitting side of the RLC entity is being reestablished, reset state variables (VT(S), VYT(A), VT(DAT), VT(MS), VT(PDU), VT(SDU), VT(RST), VT(MRW), and VT(WS)) corresponding to a transmitter; set configurable protocol parameters (MaxDat, Poll_PDU, Poll_SDU, Poll_Window, MaxRST, MaxMRW, OSD_Window_Size, and DAR_Window_Size) corresponding to the transmitter to accurate values; set a Hyper Frame Number of the transmitting side (uplink of the receiver) to a value set by the upper layer. In this operation, if only the transmitting side of the RLC entity is being reestablished, discard all control PDUs of both the receiving side and the transmitting side, and discard all already successfully transmitted SDUs of the transmitting end. Segment any not yet discarded SDUs into PDUs again based on a configured size of the PDU. If the transmitting side and the receiving side of the RLC entity are both being reestablished, discard the control PDUs of the receiving side and the transmitting side, and discard the data PDUs of the receiving side. If the transmitting side is being reestablished, regardless of whether or not the receiving side is being reestablished, stop all timers except for Timer_Poll_Periodic, Timer_Status_Periodic, and Timer_Discard, which corresponds to the SDUs that have not yet been discarded. Finally, if needed, inform the upper layer of the SDUs that have already been discarded.

When only the receiving side is being reestablished, the prior art discards all of the control PDUs of the receiving side and the transmitting side. As stated above, how to handle timers is not specifically defined in the prior arts when only the receiving side is reestablished. Those skilled in the art may follow the method for both cases of reestablishing both sides and reestablishing only the transmitting side, i.e., the RLC entity will stop all timers other than Timer_Poll_Periodic, Timer_Status_Periodic, and Timer_Discard. In other words, Timer_Poll may be stopped. If Timer_Poll is being stopped in the case that Timer_Poll_Periodic is not configured, a missing poll cannot be retransmitted within an appropriate timeframe, which causes an unnecessary increase in transmission time.

SUMMARY OF THE INVENTION

According to the present invention, a method of handling timers during re-establishing a receiving side of a wireless communications system having a communications device having an RLC entity having a transmitting side and a receiving side, comprises only re-establishing the receiving side in the RLC entity of the communications device, stopping a first timer corresponding to the receiving side, and prolonging and not stopping a second timer corresponding to the transmitting side.

According to the present invention, a communications device utilized in a wireless communications system, an RLC entity of the communications device having a transmitting side and a receiving side, utilized for accurately reestablishing the receiving side, comprises a control circuit for realizing functions of the communications device, a central processing unit for executing a program code to operate the control circuit, and a memory for storing the program code. The program code comprises only re-establishing the receiving side in the RLC entity, stopping a first timer corresponding to the receiving side, and prolonging and not stopping a second timer corresponding to the transmitting side.

These and other objectives of the present invention will no doubt become obvious to those of ordinary skill in the art after reading the following detailed description of the preferred embodiment that is illustrated in the various figures and drawings.

DETAILED DESCRIPTION

In the communications protocol specification (3GPP TS 25.322 V6.4.0 (2005-06), "Radio Link Control (RLC) protocol specification (Release 6)") established by the 3GPP, parameters, variables, timers, and control PDUs, etc. are defined according to different operating requirements. Based on the above-mentioned communications protocol specification, the parameters, variables, and timers can be defined as corresponding to the transmitting side or the receiving side of the RLC layer. Taking status variables for AM as an example, status variables corresponding to status of the receiving side comprise VR(R), VR(H), and VR(MR). Status variables corresponding to status of the transmitting side comprise VT(S), VT(A), VT(DAT), VT(MS), VT(PDU), VT(SDU), VT(RST), VT(MRW), and VT(WS). Timers corresponding to the receiving side comprise Timer-Status_Periodic and Timer_Status_Prohibit. Timers corresponding to the transmitting side comprise Timer_Poll, Timer_Poll_Periodic, Timer_Poll_Prohibit, Timer_Discard, Timer_RST, and Timer_MRT. Protocol parameters corresponding to the receiving side comprise Configured_Tx_Window_Size and Configured_Rx_Window_Size. Protocol parameters corresponding to the transmitting side comprise MaxDAT, Poll_PDU, Poll_SDU, Poll_Window, MaxRST, MaxMRW, OSD_Window_Size, and DAR_Window_Size. Definitions for the above-mentioned status variables, timers, and protocol variables can be found in the communications protocol specification, and are not repeated here.

The present invention relates to a wireless communication system operating in Acknowledged Mode, and is utilized to re-establish the receiving side accurately, so as to improve wireless transmission efficiency and prevent system errors. The wireless communications system is preferably a 3G mobile communications system.

Figure 1:
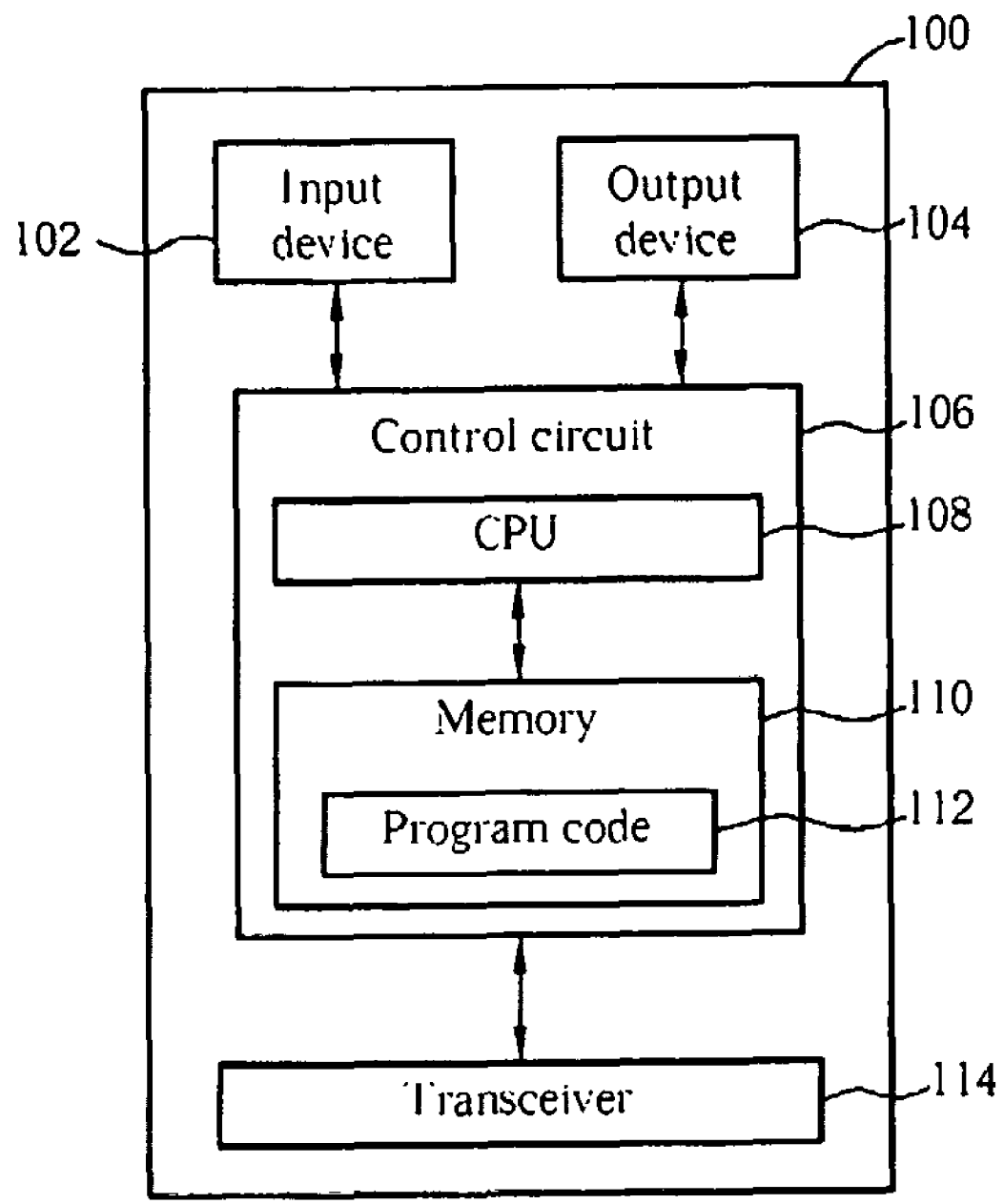
FIG. 1 is a functional block diagram of a communications device according to the present invention.

Please refer to FIG. 1, which is a functional block diagram of a communications device 100. For the sake of brevity, FIG. 1 only shows an input device 102, an output device 104, a control circuit 106, a central processing unit (CPU) 108, a memory 110, a program code 112, and a transceiver 114 of the communications device 100. In the communications device 100, the control circuit 106 executes the program code 112 in the memory 110 through the CPU 108, thereby controlling an operation of the communications device 100. The communications device 100 can receive signals input by a user through the input device 102, such as a keyboard, and can output images and sounds through the output device 104, such as a monitor or speakers. The transceiver 114 is used to receive and transmit wireless signals, delivering received signals to the control circuit 106, and outputting signals generated by the control circuit 106 wirelessly. From a perspective of a communications protocol framework, the transceiver 114 can be seen as a portion of Layer 1, and the control circuit 106 can be utilized to realize functions of Layer 2 and Layer 3.

Figure 2:
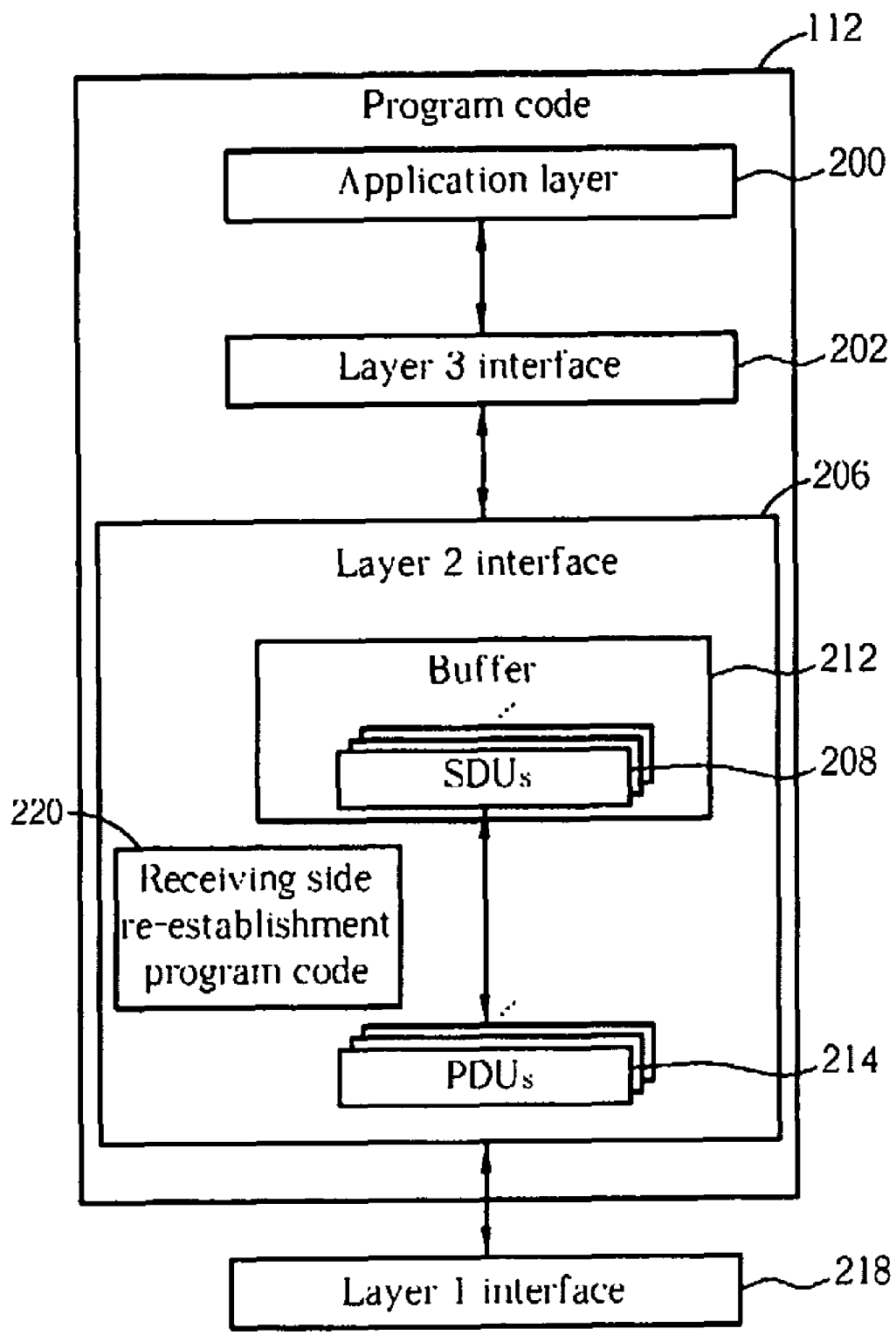
FIG. 2 is a diagram of program code of FIG. 1.

Please continue to refer to FIG. 2. FIG. 2 is a diagram of the program code 112 shown in FIG. 1. The program code 112 comprises an application layer 200, a Layer 3 interface 202, and a Layer 2 interface 206, and is coupled to a Layer 1 interface 218. When a signal is transmitted, the Layer 2 interface 206 forms a plurality of SDUs 208 according to data submitted by the Layer 3 interface 202, and stores the plurality of SDUs 208 in a buffer 212. Then, based on the SDUs 208 stored in the buffer 212, the Layer 2 interface 206 generates a plurality of PDUs 214, and sends the plurality of PDUs 214 to a destination terminal through the Layer 1 interface 218. In contrast, when a wireless signal is received, the signal is received through the Layer 1 interface 218, then delivered as PDUs 214 to the Layer 2 interface 206. The Layer 2 interface 206 restores the PDUs 214 to SDUs 208 and stores the SDUs 208 in the buffer 212. Last, the Layer 2 interface 206 delivers the SDUs 208 stored in the buffer 212 to the Layer 3 interface 202.

When the communications device 100 operates in AM, the Layer interface 2 206 is a combination of the transmitting side and the receiving side. The transmitting side and the receiving side respectively represent the transmitting and receiving portions of the RLC layer. In some circumstances, the program code 112 must re-establish the Layer 2 interface 206. The present invention can re-establish the Layer 2 interface 206 through re-establishing the receiving side based on receiving side re-establishment program code 220.

Figure 3:
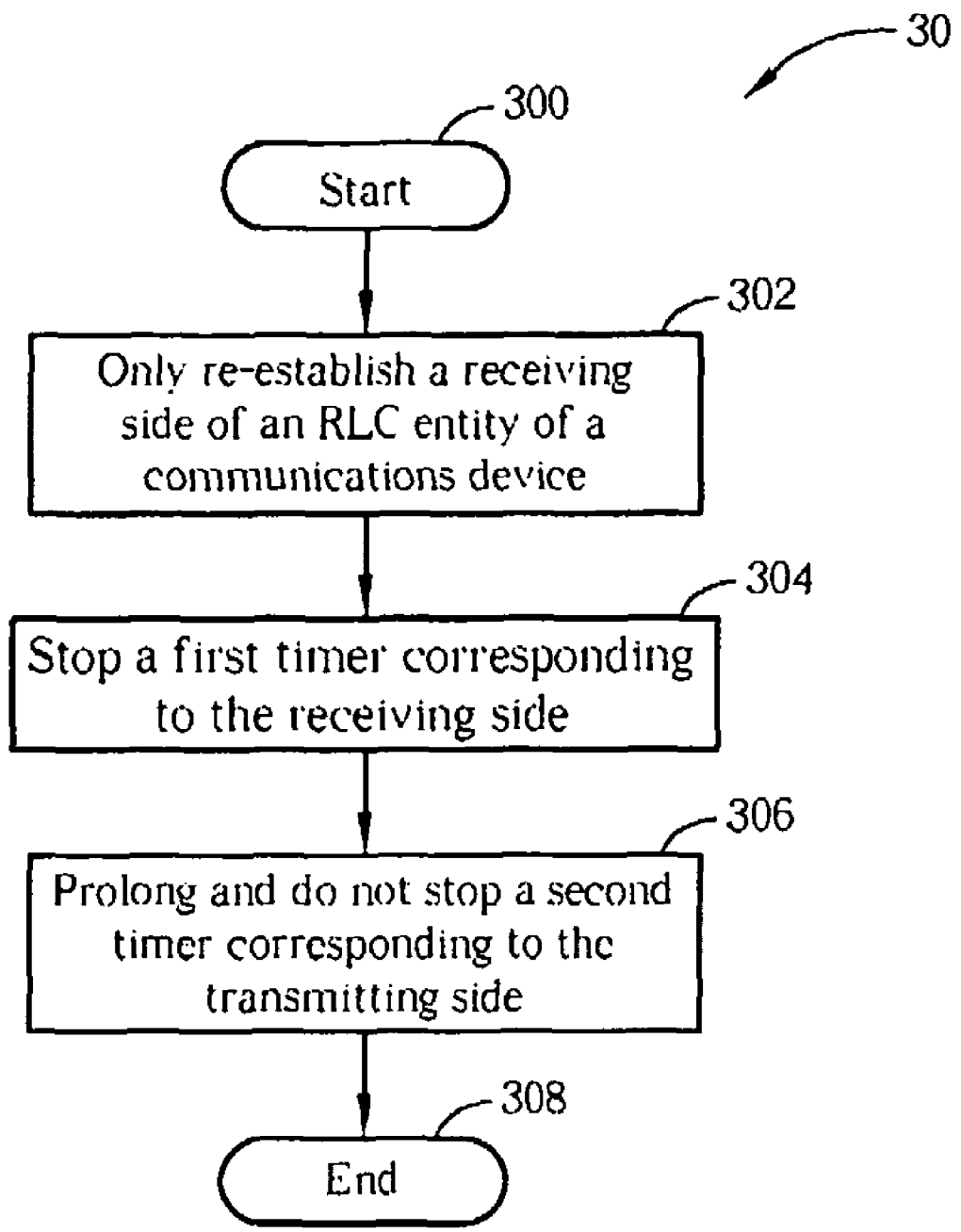
FIG. 3 is a flow chart diagram of a process according to the present invention.

Please refer to FIG. 3, which is a diagram of a process 30 according to the present invention. The process 30 is utilized to re-establish the receiving side of the wireless communications system, and can be seen as the receiving side re-establishment program code 220. The process 30 comprises steps of:

Step 300: Start.

Step 302: Only re-establishing the receiving side in the RLC entity of the communications device.

Step 304: Stopping a first timer corresponding to the receiving side

Step 306: Prolonging and not stopping a second timer corresponding to the transmitting side Step 308: End.

According to the process 30, when only the receiving side of the RLC entity is being re-established, the present invention stops the first timer corresponding to the receiving side, and prolongs and does not stop a second timer corresponding to the transmitting side. Preferably, the first timer comprises all timers, except for Timer_Status_Periodic, corresponding to the receiving side, e.g. Timer_Status_Prohibit. The second timer is Timer_Poll. Thus, when the receiving side of the RLC entity is being re-established, the RLC entity keeps Timer_Poll counting to allow the missing poll to be retransmitted within the appropriate timeframe. This increases transmission efficiency, and reduces unnecessary delays in transmission time.

Thus, when only re-establishing the receiving side, the present invention can keep Timer_Poll counting. In this situation, even if Timer_Poll_Periodic has not yet been configured, because Timer_Poll continues counting, the missing poll can be retransmitted within the appropriate timeframe to perform polling when Timer_Poll expires.

In summary of the above, the present invention allows accurate execution of the polling process during re-establishment of the receiving side of the RLC layer, which maintains transmission efficiency and reduces unnecessary transmission delay.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling timers during re-establishing a receiving side of a wireless communications system having a communications device having an Radio Link Controller (RLC) entity having a transmitting side and a receiving side, the method comprising, in step of:
    only re-establishing the receiving side in the Radio Link Controller (RLC) entity of the communications device;
    stopping a first timer corresponding to the receiving side; and
    keeping on counting and not stopping a second timer corresponding to the transmitting side to allow the missing poll to be retransmitted;
    wherein the second timer corresponding to the transmitting side is a polling timer (Timer_Poll).

2. A communications device utilized in a wireless communications system, an Radio Link Controller (RLC) entity of the communications device having a transmitting side and a
    receiving side, utilized for accurately reestablishing the receiving side, the wireless communications device comprising:
    a control circuit for realizing functions of the wireless communications device;
    a central processing unit for executing a program code to operate the control circuit; and
    a memory for storing the program code;
    wherein the program code comprises, in step of:
        only re-establishing the receiving side in the Radio Link Controller (RLC) entity;
        stopping a first timer corresponding to the receiving side; and
        keeping on counting and not stopping a second timer corresponding to the transmitting side to allow the missing poll to be retransmitted;
    wherein the second timer corresponding to the transmitting side is a polling timer (Timer_Poll).

3. The communications device of claim 2, wherein stopping the first timer corresponding to the receiving side is stopping all timers corresponding to the receiving side except a periodic status report timer (Timer_Status_Periodic).

4. The communications device of claim 2, wherein the first timer corresponding to the receiving side is a status report prohibition timer (Timer_Status_Prohibit).

5. The communications device of claim 2, wherein the wireless communications system operates in Acknowledge Mode.

6. The communications device of claim 2, wherein the communications device is a mobile phone, a wireless mobile communications device, or a networking device.

7. The method of claim 1, wherein stopping the first timer corresponding to the receiving side is stopping all timers corresponding to the 20 receiving side except a periodic status report timer (Timer_Status_Periodic).

8. The method of claim 1, wherein the first timer corresponding to the receiving side is a status report prohibition timer (Timer_Status_Prohibit).

9. The method of claim 1, wherein the wireless communications system operates in Acknowledge Mode.

10. The method of claim 1, wherein the communications device is a mobile phone, a wireless mobile communications device or a networking device.

* * * * *